United States Patent
Leau

(10) Patent No.: US 11,188,531 B2
(45) Date of Patent: Nov. 30, 2021

(54) SYSTEMS AND METHODS FOR CONVERTING AND RESOLVING STRUCTURED QUERIES AS SEARCH QUERIES

(71) Applicant: Elasticsearch B.V., Mountain View, CA (US)

(72) Inventor: Stefan Costin Leau, Bucharest (RO)

(73) Assignee: Elasticsearch B.V., Amsterdam (NL)

(*) Notice: Subject to any disclaimer, the term of this patent is extended or adjusted under 35 U.S.C. 154(b) by 553 days.

(21) Appl. No.: 15/906,824

(22) Filed: Feb. 27, 2018

(65) Prior Publication Data

US 2019/0266271 A1    Aug. 29, 2019

(51) Int. Cl.
| | |
|---|---|
| *G06F 16/2453* | (2019.01) |
| *G06F 16/30* | (2019.01) |
| *G06F 16/25* | (2019.01) |
| *G06F 16/22* | (2019.01) |
| *G06F 16/242* | (2019.01) |

(52) U.S. Cl.
CPC .... *G06F 16/24534* (2019.01); *G06F 16/2246* (2019.01); *G06F 16/2433* (2019.01); *G06F 16/258* (2019.01); *G06F 16/30* (2019.01)

(58) Field of Classification Search
CPC ............. G06F 16/2246; G06F 16/2433; G06F 16/2452; G06F 16/2453; G06F 16/24534; G06F 16/258; G06F 16/30
See application file for complete search history.

(56) References Cited

U.S. PATENT DOCUMENTS

| | | |
|---|---|---|
| 6,519,597 B1 | 2/2003 | Cheng et al. |
| 7,945,533 B2 | 5/2011 | Krishnaprasad et al. |
| 8,352,519 B2 | 1/2013 | Nath |
| 8,615,794 B1 | 12/2013 | Tomilson et al. |
| 8,898,261 B1 | 11/2014 | Patsenker et al. |
| 8,930,332 B2 | 1/2015 | Burstein |

(Continued)

FOREIGN PATENT DOCUMENTS

| | | |
|---|---|---|
| CN | 106528797 A * | 3/2017 |
| CN | 106934062 A * | 7/2017 |

(Continued)

OTHER PUBLICATIONS

Kline. SQL in a Nutshell. Dec. 2000 [retrieved on Jul. 28, 2020]. O'Reilly Media, Inc. Retrieved from the Internet:< URL https://learning.oreilly.com/library/view/sql-in-a/1565927443/ > Chapter: 'Dialects of SQL'. ISBN: 9781565927445 (Year: 2000).*

(Continued)

*Primary Examiner* — James E Richardson
(74) *Attorney, Agent, or Firm* — Carr & Ferrell LLP

(57) ABSTRACT

Systems and methods for processing structured queries as search queries are provided herein. An example system includes a structured query language (SQL) parser that parses a SQL structured query into a tree structure; an analyzer module that generates a logical plan from the tree structure; a planner module that generates an optimized logical plan from the logical plan; and an execution module that: generates a physical plan from the optimized logical plan, the physical plan comprising a search query that can be executed by a search engine; and returns results of the search query to a client.

11 Claims, 15 Drawing Sheets

(56) References Cited

U.S. PATENT DOCUMENTS

| | | | |
|---|---|---|---|
| 9,015,301 | B2 | 4/2015 | Redlich et al. |
| 9,734,180 | B1* | 8/2017 | Graham ............... G06F 16/2455 |
| 10,541,983 | B1 | 1/2020 | Varnamkhasti et al. |
| 10,891,165 | B2 | 1/2021 | Willnauer |
| 10,997,204 | B2 | 5/2021 | Leskes |
| 2005/0004892 | A1* | 1/2005 | Brundage ............ G06F 16/8365 |
| 2005/0114397 | A1 | 5/2005 | Doshi et al. |
| 2009/0276215 | A1 | 11/2009 | Hager |
| 2011/0282839 | A1 | 11/2011 | Paksoy et al. |
| 2012/0233118 | A1 | 9/2012 | Holt et al. |
| 2012/0233299 | A1 | 9/2012 | Attanasio et al. |
| 2013/0086039 | A1* | 4/2013 | Salch .................... G06F 16/183 707/717 |
| 2013/0297469 | A1 | 11/2013 | Spittle et al. |
| 2014/0012814 | A1 | 1/2014 | Bercovici et al. |
| 2014/0157224 | A1 | 6/2014 | Capuozzo et al. |
| 2014/0279871 | A1 | 9/2014 | Ochoa et al. |
| 2014/0330785 | A1 | 11/2014 | Isherwood et al. |
| 2015/0280999 | A1 | 10/2015 | Chart et al. |
| 2015/0379083 | A1* | 12/2015 | Lang ................ G06F 16/24568 707/722 |
| 2016/0085839 | A1 | 3/2016 | D'Halluin et al. |
| 2016/0191509 | A1 | 6/2016 | Bestler et al. |
| 2016/0203168 | A1 | 7/2016 | Gangadharappa |
| 2016/0203174 | A1 | 7/2016 | Shahane et al. |
| 2016/0224600 | A1 | 8/2016 | Munk |
| 2016/0292171 | A1 | 10/2016 | Bhagat et al. |
| 2017/0024453 | A1 | 1/2017 | Raja et al. |
| 2017/0124151 | A1* | 5/2017 | Ji ....................... G06F 16/24542 |
| 2017/0193041 | A1 | 7/2017 | Fuchs |
| 2017/0371926 | A1* | 12/2017 | Shiran ............... G06F 16/24542 |
| 2018/0189328 | A1 | 7/2018 | Frazier et al. |
| 2018/0268000 | A1 | 9/2018 | McManus et al. |
| 2019/0026336 | A1* | 1/2019 | Tian .................... G06F 16/2433 |
| 2020/0050612 | A1 | 2/2020 | Bhattacharjee et al. |
| 2020/0084213 | A1 | 3/2020 | Taropa |
| 2020/0133550 | A1 | 4/2020 | Willnauer |
| 2020/0176098 | A1 | 6/2020 | Lucas et al. |
| 2020/0201879 | A1 | 6/2020 | Leskes |
| 2020/0326986 | A1 | 10/2020 | Willnauer |
| 2020/0328936 | A1 | 10/2020 | Pérez-Aradros Herce et al. |
| 2020/0348878 | A1 | 11/2020 | Leskes |
| 2021/0124620 | A1 | 4/2021 | Willnauer |
| 2021/0126977 | A1 | 4/2021 | Ruflin et al. |
| 2021/0240731 | A1 | 8/2021 | Leskes |

FOREIGN PATENT DOCUMENTS

| | | |
|---|---|---|
| GB | 2592130 A | 8/2021 |
| WO | WO2020131330 A1 | 6/2020 |

OTHER PUBLICATIONS

Ronald. "SQL, ANSI Standards, PostgreSQL and MySQL". Mar. 26, 2015 [retrieved on Jun. 4, 2021]. Retrieved from the Internet: < URL http://ronaldbradford.com/blog/sql-ansi-standards-postgresql-and-mysql-2015-03-26/ (Year: 2015).*

Ajqc. "can i use elasticsearch-sql to convert sql to DSL?• Issue #156". GitHub. Feb. 2016 [retrieved on Jul. 29, 2020], Retrieved from the Internet:< URL https://github.com/NLPchina/elasticsearch-sql/issues/156 (Year: 2016).*

Abhishek Andhavarapu. "Beginners guide to querying Elasticsearch (Scoring vs Sorting)". Jul. 6, 2017 [retrieved on Jun. 4, 2021]. Retrieved from the Internet:< URL https://abhishek376.wordpress.com/2017/07/06/begginers-guide-to-querying-elasticsearch/ (Year: 2017).*

"International Search Report" and "Written Opinion of the International Searching Authority," Patent Cooperation Treaty Application No. PCT/US2019/063437, dated Feb. 7, 2020, 8 pages.

Tedor, Jason, "Introduce Cross-Cluster Replication"; GitHub [online], Sep. 5, 2017 [retrieved Jan. 24, 2020], retrieved from the Internet: <https://github.com/elastic/elasticsearch/issues/30086>, 9 pages.

Willnauer, Simon Daniel, "Shard Splitting," U.S. Appl. No. 16/176,956, filed Oct. 31, 2018, Specification, Claims, Abstract, and Drawings, 47 pages.

Willnauer, Simon Daniel, "Frozen Indices," U.S. Appl. No. 16/383,562, filed Apr. 12, 2019, Specification, Claims, Abstract, and Drawings, 50 pages.

Leskes, Boaz, "Cross Cluster Replication," U.S. Appl. No. 16/229,847, filed Dec. 21, 2018, Specification, Claims, Abstract, and Drawings, 53 pages.

Makwarth et al., "Distributed Tracing for Application Performance Monitoring," U.S. Appl. No. 16/381,997, filed Apr. 11, 2019, Specification, Claims, Abstract, and Drawings, 43 pages.

"Extended European Search Report", European Patent Application No. 21165715.0, dated Dec. 10, 2020, 7 pages.

"Office Action", British Patent Application No. 2104443.3, dated Aug. 16, 2021, 9 pages.

"Office Action", British Patent Application No. GB2105205.5, dated Oct. 4, 2021, 11 pages.

* cited by examiner

"*match*" : { "gender" : { "query" : "M" }}

"*term*" : { "gender" : { "value" : "M" }}

"_source" : { "includes" : [ "birth_date" ] } ⤺ 902

"docvalue_fields" : [ "emp_no", "first_name", "gender", "last_name", "salary", "tenure" ] ⤺ 904

*FIG. 9*

"sort" : [{ "gender.keyword" : { "order" : "asc" }}]

*FIG. 10*

"match" : { "first_name" : { "query" : "Erez", "operator" : "OR" }}

SELECT ... WHERE
MATCH(first_name, 'Erez')

"multi_match" : { "query" : "Erez", "fields" : [ "first_name^1.0", "last_name^2.0"] }

SELECT ... WHERE
MATCH('first_name, last_name^2', 'Erez')

"query_string" : { "query" : "Baek fox"}

SELECT ... WHERE
QUERY('Baek fox')

```
"'sql
SELECT first_name FROM test_emp WHERE languages > 1 ORDER BY last_name
'''
```

1504

```
"'json
{
// WHERE...
"query" : {
  "range" : {
    "languages" : {
      "from" : 1,
      "to" : null,
      "include_lower" : false,
      "include_upper" : false,
    }
  }
},
// SELECT first_name
"_source" : {
  "includes" : [
    "first_name"
  ]
},
// ORDER BY (on exact/not-analyzed field through .keyword)
"sort" : [
  {
    "last_name.keyword" : {
      "order" : "asc"
    }
  }
]
}
'''
```

FIG. 15

SYSTEMS AND METHODS FOR CONVERTING AND RESOLVING STRUCTURED QUERIES AS SEARCH QUERIES

CROSS REFERENCE TO RELATED APPLICATIONS

N/A

FIELD OF THE PRESENT TECHNOLOGY

The present technology relates generally to query processing systems, and more particularly, but not by limitation, to systems and methods that convert and resolve structured queries (e.g., SQL formatted queries) as search queries, allowing for operations such as full-text searching and other similar search query operations using input in the form of a structured query.

SUMMARY

Various embodiments of the present technology include a search engine system that converts and processes structured queries as search queries, the system comprising: a structured query language (SQL) parser that parses a SQL structured query into a tree structure; an analyzer module that generates a logical plan from the tree structure; a planner module that generates an optimized logical plan from the logical plan; and an execution module that generates a physical plan from the optimized logical plan, the physical plan comprising a search query that can be executed by a search engine; and returns results of the search query to a client.

Various embodiments of the present technology include a system comprising: a processor; and a memory for storing executable instructions, the processor executing the instructions to: allow a user to input a structured query language (SQL) request; convert the SQL request into a physical plan comprising a search query that can be executed by a search engine using pattern matching implemented as a rule set; performing a search query using the physical plan to produce results; and return a response to the SQL structured query based on the results of the search query.

Various embodiments of the present technology include a method comprising: receiving a structured query language (SQL) query from a user; converting the SQL query to an executable search query by: parsing the SQL structured query into a tree structure; generating a logical plan from the tree structure; generating an optimized logical plan from the logical plan; and generating a physical plan from the optimized logical plan, the physical plan being folded into a search query that can be executed by a search engine; and returning results of the search query to a client.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 9 illustrates another example analyzed versus non-analyzed versions of physical plans.

FIG. 10 illustrates an example sorting physical plan.

FIG. 11 illustrates various example physical plans generated from structure queries, which allow for full text searches.

FIG. 15 is an example conversion of a structured query (SQL) into a physical plan using the aspects of the present disclosure.

DETAILED DESCRIPTION

Figure 1:
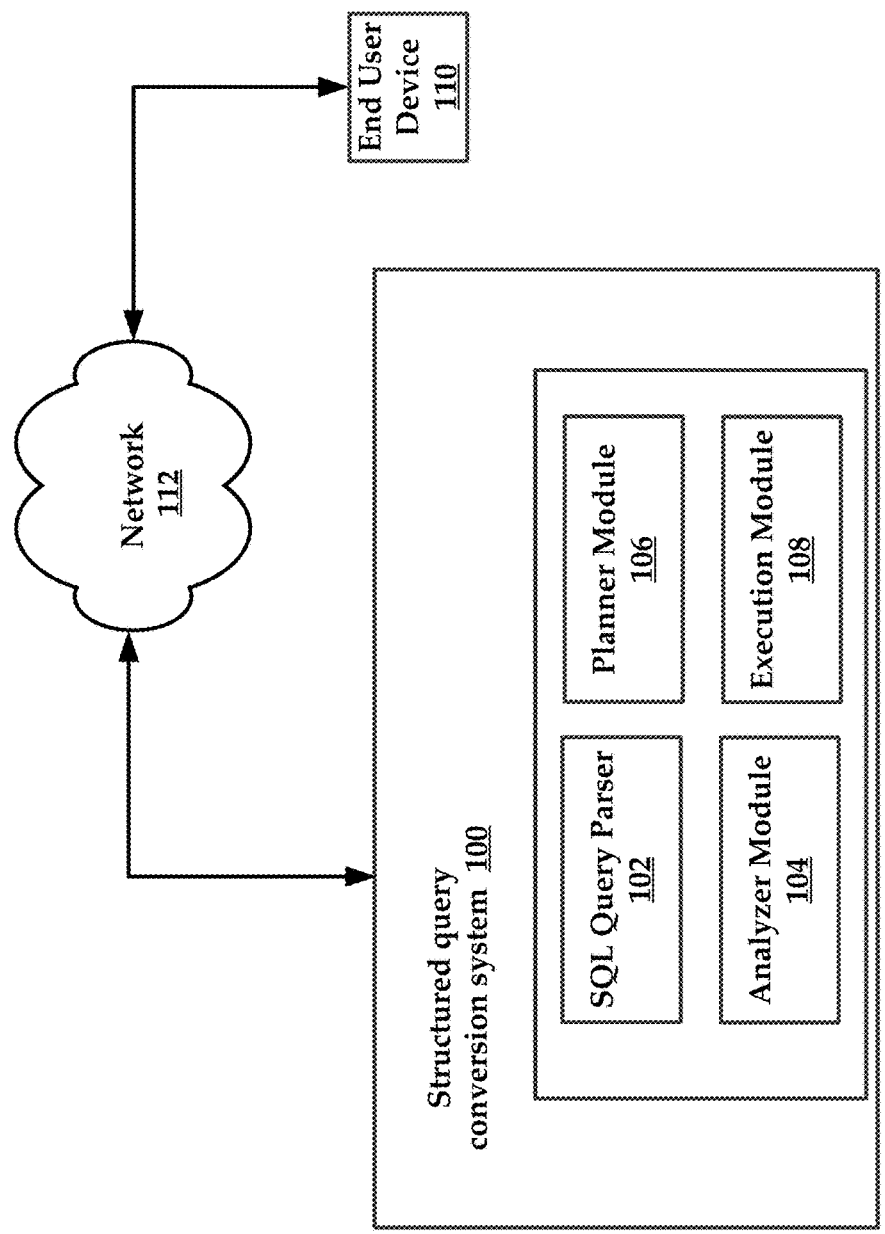
FIG. 1 is a high level schematic diagram of computing architecture for practicing aspects of the present technology.

The present disclosure is directed to various embodiments of systems and methods that implement a structured query conversion system that is a SQL interface to a search and analytics engine such as Elasticsearch™. In general, Elasticsearch™ is a distributed, RESTful search and analytics engine. Generally described, the structured query conversion system acts as a convertor or translator allowing traditional formal SQL queries to be executed against Elasticsearch™ indices without any modifications to the SQL queries on the end user side. That is, the user need only know how to format a SQL query and is not required to understand or convert or modify any part of the SQL query into input that can be used by the Elasticsearch™ search system. The structured query conversion system also provides the user with a response that is in a familiar structured query response format, despite being resolved as a search query.

In some embodiments, the structured query conversion systems and methods disclosed herein map a given SQL query, if possible, to at least one Elasticsearch query DSL. It will be understood that DSL stands for Domain Specific Language that is a computer language specialized to a particular application domain. Elasticsearch™ utilizes query DSL; a specific language for doing queries (searches and aggregations).

Since Elasticsearch™ is not a relational database structured query conversion systems of the present disclosure are created with Elasticsearch™ in mind first and SQL second. In fact, even the grammar utilized herein introduces Elasticsearch™ specific components that have no concept in ANSI SQL.

In general, an example architecture of an example structured query conversion system of the present disclosure utilizes both logical and physical algebra to convert a SQL query to a search query. The structured query conversion system uses an extensible algebraic and logical set of operators to describe an operation to its underlying engine. The engine maps a user query into logical algebra (e.g., logical plan) and then translates this into physical algebra (e.g., physical plan).

In some embodiments, the structured query conversion system uses a rule set to identify patterns in the logical plan. In more detail, the rule set provides a way to identify relevant patterns inside the plans that can be worked upon. In other words, the use of a logical plan, which represents what the user has requested in SQL format and a physical plan, which is what the engine needs to execute based on the user request. To manipulate the plans, the engine performs one or more methods of pattern matching implemented as rules that get applied over and over until no matches are found. An example of a rule would be expanding to actual concrete references.

Each rule executes against one particular pattern that it tries to identify in the logical plan. For example one dedicated rule can converts a star (*) into its respective fields. Essentially each rule offers the solution for one individual problem. In a rule set, one or multiple rules can match a particular use query which is on purpose—some queries are more complicated than others. However by using a rules engine approach, the query is broken down into individual_known_patterns (or problems) that can be solved in isolation leading to the resolution of the entire query/problem.

Conceptually, the systems and methods herein recognize that a building operation of the SQL engine is defined by an action, namely a rule package that accepts one immutable tree and transforms it to another and different immutable tree.

Each rule examines the logical plan for a certain pattern that it can identify and then transform in to a component of a search query.

In some embodiments, the structured query conversion system utilizes three main types of trees: (1) a logical plan that is a logical representation of a user query. Any transformation of this plan should result in an equivalent physical plan or other modified form of the logical plan. That is, for the same input, it will generate the same output. A physical plan (2) is an executable representation of a user query. This plan needs to translate to at least one query to Elasticsearch™. Many queries can be connected together, which is functionally similar to JOIN codes of SQL. Thus, different strategies for generating a physical plan will be available depending on a computing cost (either monetary or computational resources) to the end user.

Another tree type (3) is an expression tree. Both the logical and physical plan each comprises an expression tree that needs to be incorporated into the resultant search query.

Each of these types of trees inside the structured query conversion system has at least the following properties: immutability (each node and its properties are immutable, where a change in a property results in a new node which results in a new tree); resolution (due to the algebraic nature of SQL, each tree has the notion of resolution which indicates whether it has been resolved or not. A node can be resolved only if it and its children have all been resolved; and traversal (each tree can be traversed top-to-bottom/pre-order/parents-first or bottom-up/post-order/children-first. The difference in the traversal depends on the pattern that is being identified).

In some embodiments, a flow inside the conversion engine includes the following processes. In a first process the conversion engine receives a query from a user in SQL format. In a second process the query is parsed and transformed into an unresolved abstract syntax tree (AST) or logical plan. The logical plan gets analyzed and resolved in a third process. The logical plan gets optimized in a fourth process. In a fifth process, the logical plan gets transformed into a physical plan. In a sixth process, the physical plan gets mapped and then folded into an Elasticsearch™ query. The Elasticsearch™ query gets executed in a seventh and final step.

In some embodiments, the systems and methods allow for pattern matching and to implement these concepts, several choices have been made in the conversion engine, which are described herein.

In some instances, components of the system comprise a tokenizer and a lexer of SQL grammar. The system will translate a user query into an AST tree or logical plan. The system also cooperates to ensure that the user query (e.g., SQL query) is syntactically valid. The system also performs basic inspection of the logical plan for gathering critical information for the main analysis. This stage is separate from the analysis phase since the system performs asynchronous/remote calls to Elasticsearch. A cluster represents an Elasticsearch system, made out of one or multiple nodes or Elasticsearch instances. The SQL implementation while running inside Elasticsearch, can send these requests either to the local or a separate Elasticsearch system or cluster.

In some embodiments, the system performs logical plan analysis, resolution and, verification. The system also ensures that the user query is actually valid and semantically valid. The system can also transform the resolved logical plan into a semantically equivalent tree, meaning for the same input, the same output is produced.

In some embodiments, a planner of the system performs query planning. The planning is made up of two components, a code mapper that maps the logical plan to a physical plan and a folder module that folds or rolls-up the physical plan into an Elasticsearch™.

The system then performs actual execution of the query, results retrieval, extractions and translation into a row and set format. This format is familiar to users who utilize SQL and thus the user not only provides a SQL format input, but receives a SQL format output.

FIG. 1 is an example architecture of a structured query conversion system (referred to as system 100) that receives SQL queries, translates them into Elasticsearch™ queries, and returns results to a user. In some embodiments, the results are provided in a format that is similar to how SQL query results are structured. An end user device 110 such as an end user computing system can couple with the system 100 to provide structured queries and receive search results from the system 100. The end user device 110 can communicatively couple with the system 100 over a network 112.

In general, the structured query conversion system 100 comprises a structured query language (SQL) parser (SQL parser 102), an analyzer module 104, a planner module 106, and an execution module 108.

Generally speaking, the SQL parser 102 receives and parses a SQL structured query into a tree structure. The analyzer module 104 generates a logical plan from the tree structure, and the planner module 106 generates an optimized logical plan from the logical plan. In some embodiments, the execution module 108 generates a physical plan from the optimized logical plan. To be sure, the physical plan comprising a search query that can be executed by a search engine. The execution module 108 also returns results of the search query to a client. Again, this can include a result that is in a format that would be expected for a SQL query, such as a row and set format.

In some embodiments, the SQL parser 102 generally functions as a parser and tokenizer and the analyzer module 104 includes lexer functions, although it will be understood that the functions of one or more modules can be combined.

In one or more embodiments, the system 100 is generally configured to allow a user to input a structured query language (SQL) request. The system 100 then converts the SQL request into a physical plan comprising a search query that can be executed by a search engine using pattern matching implemented as a rule set. The system also performs a search query using the physical plan to produce results and then returns a response to the SQL structured query based on the results of the search query.

According to some embodiments, the SQL parser 102 is configured to receive a SQL format (e.g., structured) query from a user. In some embodiments, the system 100 can provide a customer facing GUI that allows a user to enter a SQL query. In another embodiment, SQL queries are received as a message or stream. Regardless of the method by which the system 100 receives a SQL query, the SQL parser 102 parses the SQL structured query into a tree structure 202. The tree structure includes components of the SQL search, which are represented and referred to as tokens. For example, components of the tree structure 202 include 'queryNoWidth'; 'expression'; and 'predicated' tokens.

Figure 2:
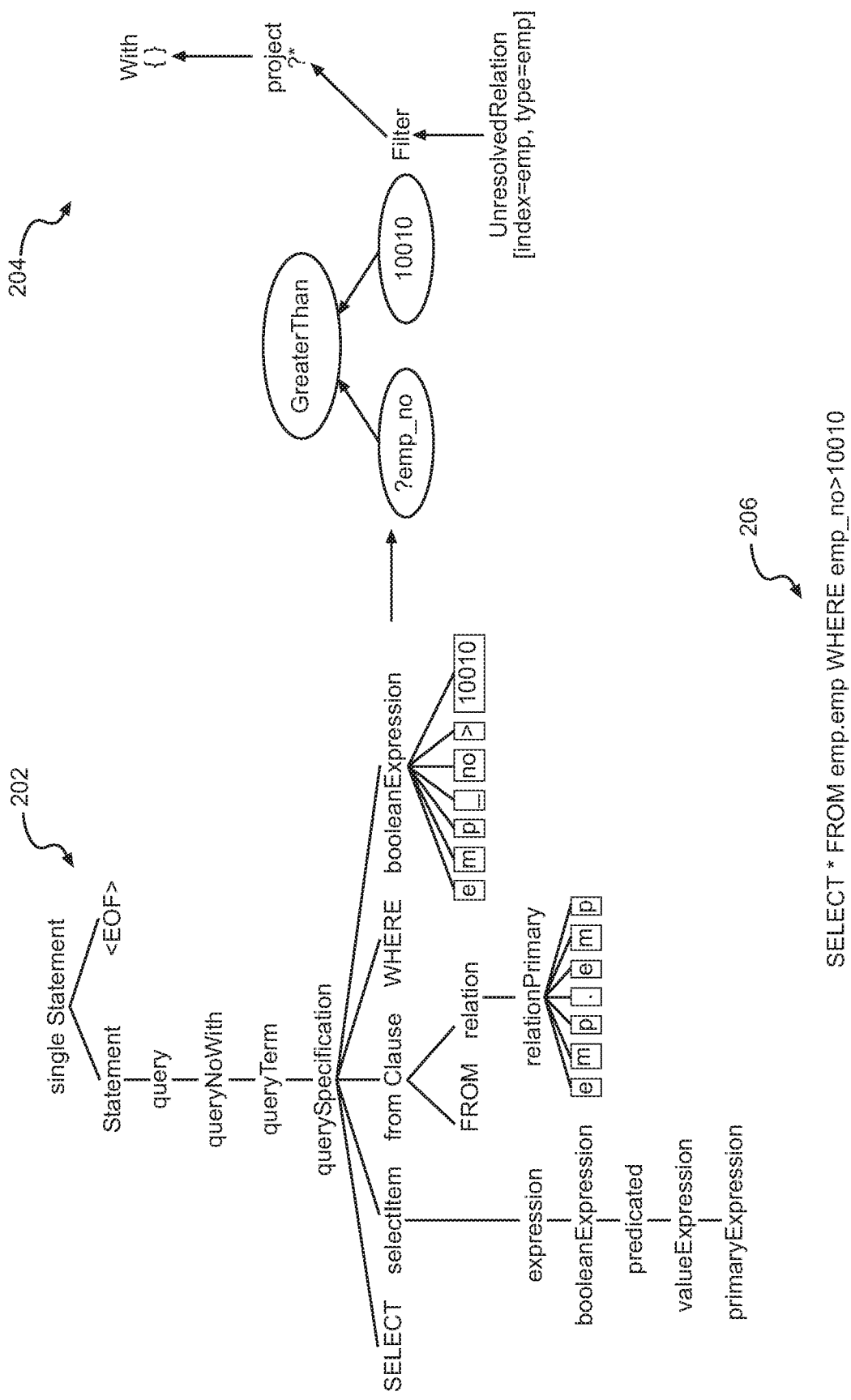
FIG. 2 illustrates an example parsing of a SQL query into a logical plan.

An example parsing of a SQL query into a logical plan is illustrated in FIG. 2. In FIG. 2, a parsed tree structure 202 is generated from a SQL format query. This tree structure 202 includes all the terms of the SQL format query. This tree structure 202 is transformed into a logical plan 204.

The original structured query 206 is illustrated as well. The process for generating an example Elasticsearch™ query is described in greater detail herein. To be sure, a physical plan created from the logical plan 204 is utilized to generate a search query. Methods for further processing the logical plan, generating a physical plan from a logical plan, and generating a search query from a physical plan are disclosed in greater detail herein.

Figure 3:
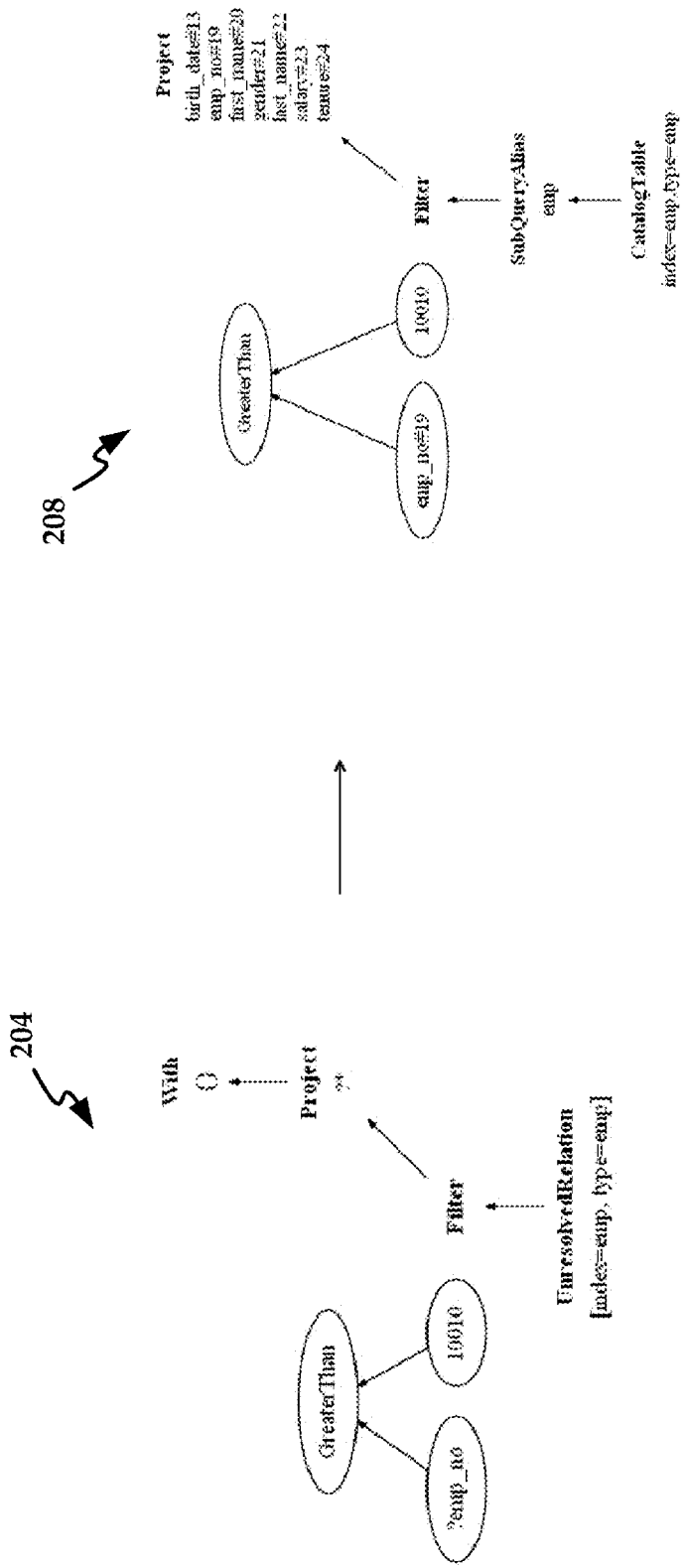
FIG. 3 illustrates an example validation and resolving of components or objects in a logical plan.

In FIG. 3, output of the analyzer module 104 is illustrated which validates the SQL query and resolve objects in the SQL query and the initial logical plan 204 such as tables, columns, functions, aliases, and namespaces—just to name a few. The resolved logical plan 208 of the initial logical plan 204 is then generated. That is, the analyzer module will validate components of the structured query, so as to ensure that the components are syntactically valid.

Figure 4:
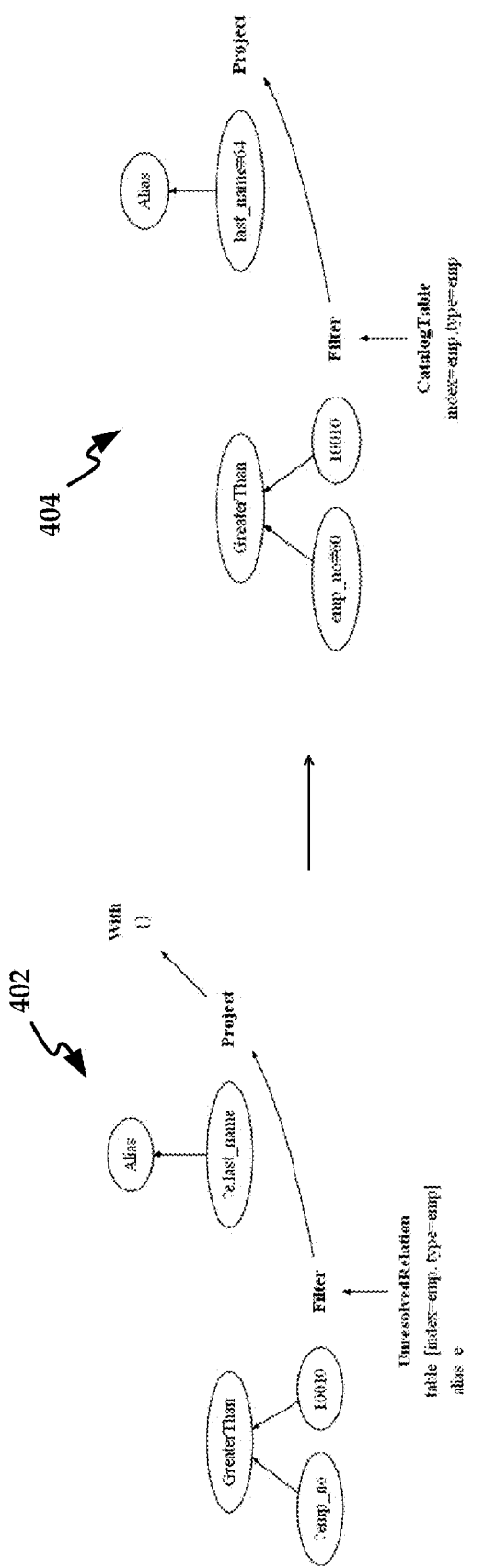
FIG. 4 illustrates an example aliasing process of a logical plan.

In various embodiments, the analyzer module 104 is configured to perform aliasing of a logical plan (or a resolved logical plan) into an aliased logical plan. An example aliasing operation is illustrated in FIG. 4, where a logical plan 402 is processed through aliasing into an aliased logical plan 404.

Figure 5:
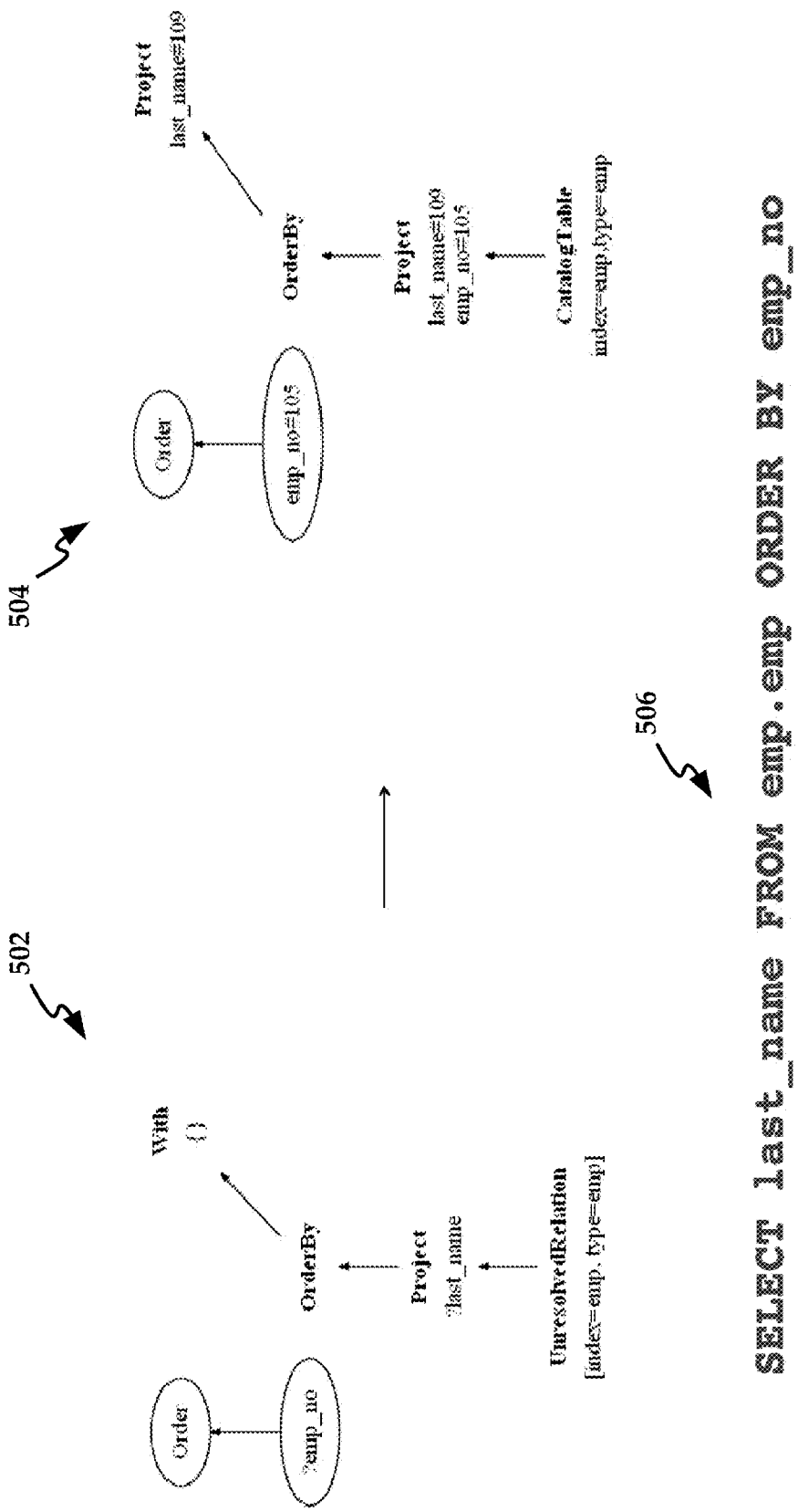
FIG. 5 illustrates a process or resolving hidden references in a logical plan.

Some embodiments allow for the analyzer module 104 to resolve hidden references. For example, as in FIG. 5, a logical plan 502 may include hidden references that are resolved by converting the logical plan 502 into a second logical plan 504 that allows for resolution of hidden references. A corresponding structured query 506 is provided for illustration. Of note, a physical plan created from the second logical plan 504 is required to generate a search query.

In general, hidden references refer to references that are available but get filtered by intermediate levels of processing and thus cannot be resolved higher up. This can cause a valid query to fail forcing the user to modify the query. However the engine can look for this 'pattern' and unhide the reference accordingly.

These methods are generally referred to as resolving components of the structured query. In one or more instances, the analyzer module 104 can generate a resolved logical plan from a tree structure using aliasing of at least a portion of the components of the structured query. The act of resolving a logical plan involves resolving specific components of the components of the structured query, so as to ensure that the components are semantically valid. Thus, using both validating and resolving, the logical plan can be both syntactically and semantically valid.

Figure 6:
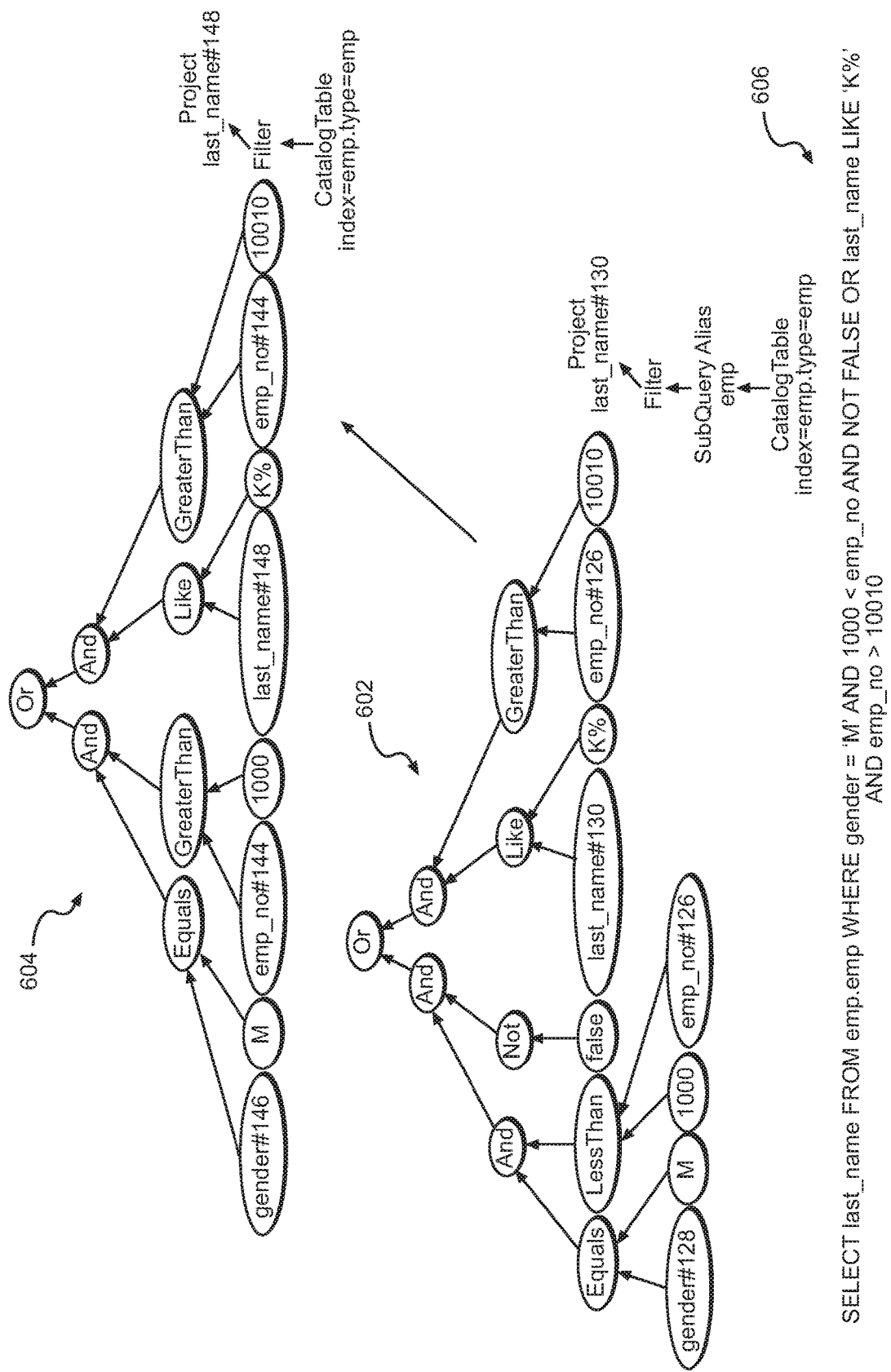
FIG. 6 illustrates optimizing of a logical plan.

In some embodiments, a logical plan can be optimized prior to conversion into a physical plan. FIG. 6 illustrates an example process for optimizing an initial logical plan 602 into an optimized logical plan 604. A corresponding structured query 606 used to generate the optimized logical plan 604 is illustrated. Of note, a physical plan created from the optimized logical plan 604 is required to generate any resultant search query. In some embodiments, the process illustrated in FIG. 6 is performed by the planner module 106. The planner module 106 generates an optimized logical plan from a logical plan (could be resolved and/or aliased) by performing any of operator simplifications, operator pruning, execution simplification, and execution elimination, and combinations and permutations thereof.

Figure 7:
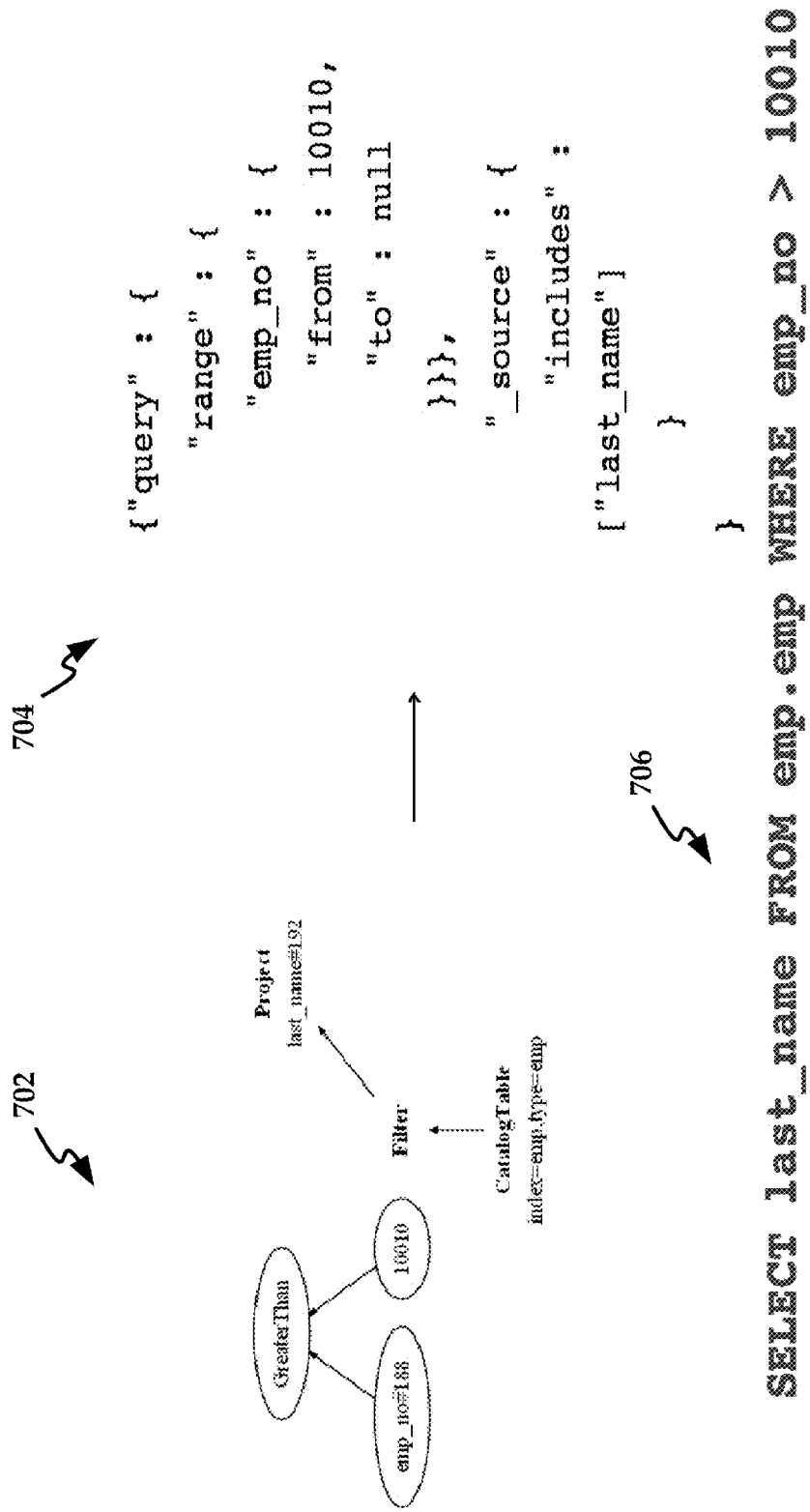
FIG. 7 illustrates conversion of a logical plan into a physical plan.

In various embodiments, the planner module 106 is also configured to convert the logical plan into a physical plan, as illustrated in FIG. 7. In general, a physical plan 702 comprises automatically generated executable code that can be executed by a search engine to resolve the original SQL structured query. The physical plan 702 is generated from a logical plan 704. An example structured query 706 used to generate the physical plan 702 is illustrated.

According to some embodiments, the execution module 108 executes the physical plan and/or search query and then streams results to the end user. The execution module 108 can also keep track of references and handles conversion of results into a tabular format (e.g., aggregations as a tree vs as a table). The execution module also allows for data type conversion methods.

Figure 8:
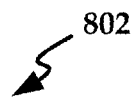
FIG. 8 illustrates analyzed versus non-analyzed versions of physical plans.
Figure 8:
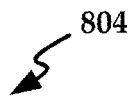

In some embodiments, the system 100 can perform both analyzed and non-analyzed queries. Examples of analyzed operations within search queries include full-text search and default search for strings (text based). These methods also include a non-analyzed field, such as when a keyword is included in the search query. Examples of non-analyzed operations include, but are not limited to, aggregations and exact matches, which can be used as default for non-string analysis (e.g., not textual). Non-analyzed operations are also used for processes such as sorting and aggregation. Examples of analyzed versus non-analyzed physical plans are illustrated in FIG. 8. An example match query 802 (e.g., analyzed) is compared with an example term query 804 (e.g., not-analyzed) for the search query "SELECT . . . WHERE gender='M'". FIG. 9 illustrates further examples with a "source and include" query 902 compared with a docvalue_fields query 904.

For context, analysis with respect to Elasticsearch and that of a search engine are somewhat different. Search engines are based around the context of an inverted index (which indicates the location where a word appears). To properly identify variations for a text, it is being "broken down" that is deconstructed into its root form: (it is being lower cased, punctuation and space removed, prefix/suffixes removed).

In contract a not-analyzed form, in the context of a search-engine (and Elasticsearch) means the exact value as the user added it. A not-analyzed form can be used for computations (and aggregations) while the analyzed form for full-text searches. The vice-versa does not apply (as it produces incorrect results and is prohibitive computational wise).

A sorting physical plan is illustrated in FIG. 10, which corresponds to a structured query "SELECT . . . ORDER BY gender." FIG. 11 illustrates physical plans generated from structure queries, which allow for full text searches. To be sure, SQL does not allow for or support analytical searching and/or full-text searching. Thus, the conversion of the logical plan to a physical plan increases the granularity and specificity of a corresponding structured query. Each physical plan is paired with a structured query from which it was created. The physical plan is on top and the structured query is positioned below the physical plan.

Also, the search queries generated using logical and physical plans as disclosed herein allow for performing functions such as aggregations (e.g., average, count, maximum). These functions can also be mapped onto metrics aggregations. Other functions such as scalar date extraction can easily be performed through physical plan scripting. Monotonic functions are also advantageously optimized using scalar processes.

Figure 12:
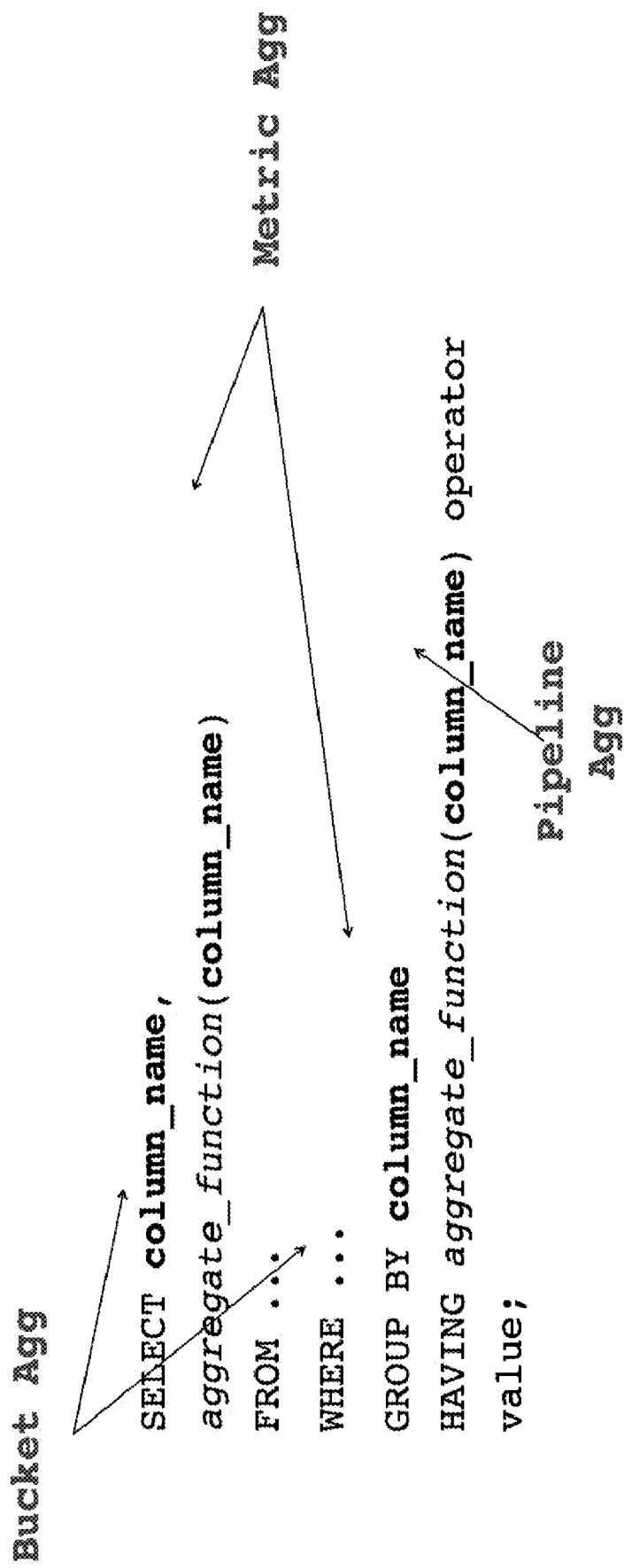
FIG. 12 illustrates an example physical plan that allows for a grouping function based on a "by" and a "having" conditions.

FIG. 12 illustrates an example physical plan that allows for a grouping function based on a "by" and a "having" conditions. Bucket aggregation occurs through the SELECT and WHERE operators, while the metric is defined using the aggregate_function and GROUP BY operators. The HAVING aggregate_function operator provides a pipeline aggregation functionality.

In general, a bucket aggregation is an aggregation (a function that works on multiple values) that produces a group or a bucket of values. It is used to "bucket" values on a criteria (for example break down a time interval into days or other delineated period of time).

Figure 13:
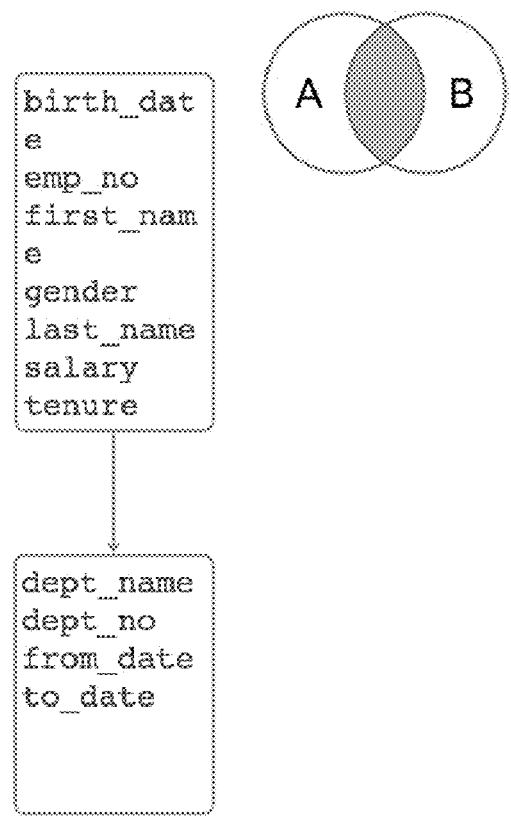
FIG. 13 illustrates example nested documents that correspond to the expressions illustrated in FIG. 12.

As noted above, the search queries (e.g., Elasticsearch™) herein can be adapted to allow for specific SQL operations such as JOIN operations using nested and parent-child relationships. An example JOIN search query function includes "SELECT dep.dept_name, last_name FROM emp.emp WHERE emp_no=10020". Another example JOIN=search query function includes "SELECT last_name FROM emp.emp WHERE dep.dept_name='Production'". An example representation of nested documents is illustrated in FIG. 13.

Figure 14:
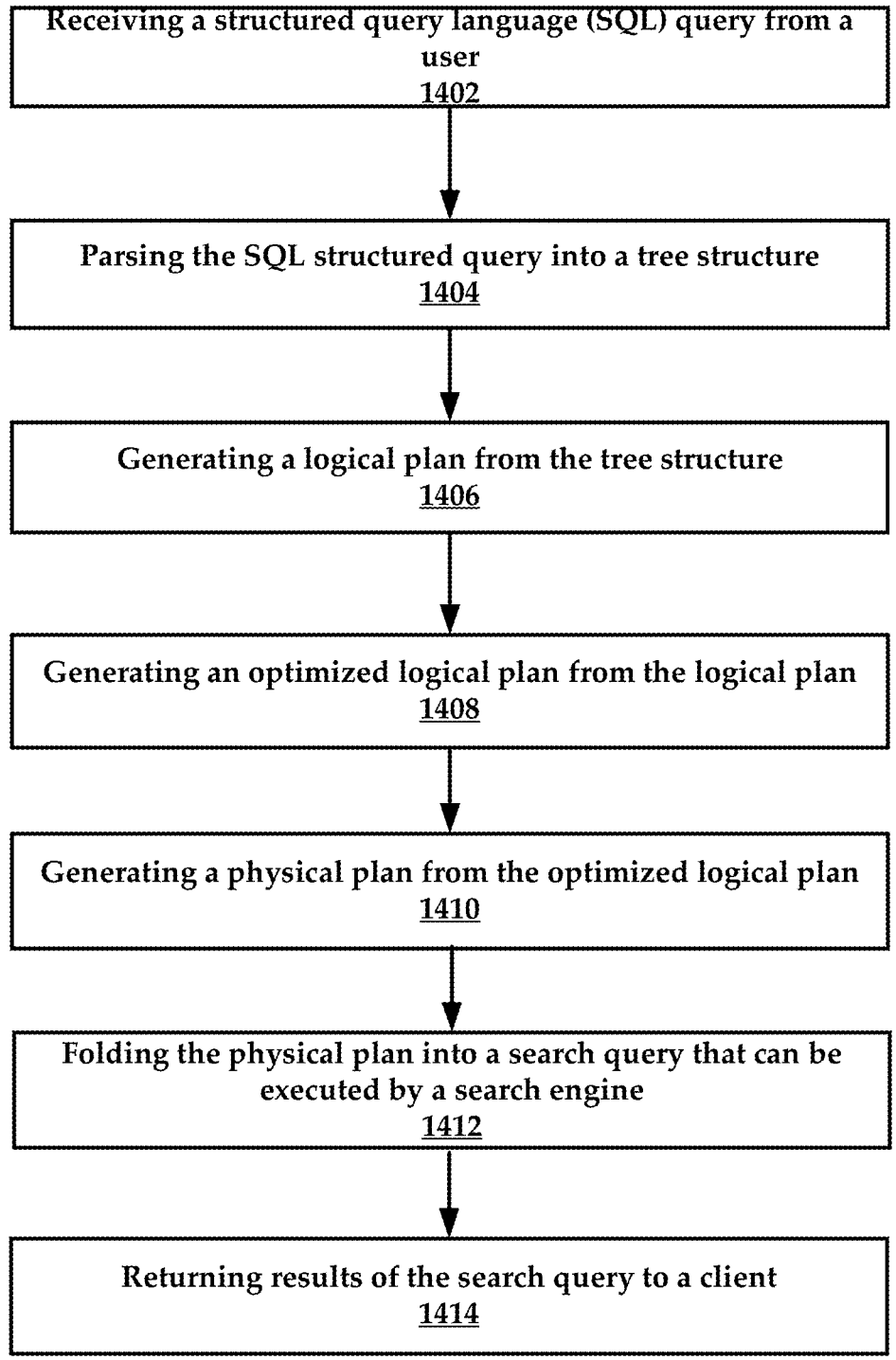
FIG. 14 is a flowchart of an example method that involves both the conversion of a structured query into a search query, as well as the execution of the search query and the return of results of the search query in a row set format.

FIG. 14 is a flow diagram of an example method. The method involves both the conversion of a structured query into a search query, as well as the execution of the search query and the return of results of the search query in a row set format.

In some embodiments, the method comprises a step 1402 of receiving a structured query language (SQL) query from a user. Once received, the SQL query is converted into an executable search query using a set of operations. In some embodiment, the method includes a step 1404 of parsing the SQL structured query into a tree structure. Once the tree structure is generated, the method includes a step 1406 of generating a logical plan from the tree structure. This logical plan is the equivalent of a logical algebraic expression of the tree structure. In some instances, optional steps of validating and resolving various components of the tree structure can be performed so as to ensure that the components of the tree structure/logical plan created are both semantically and syntactically valid.

In some embodiments, the method includes a step 1408 of generating an optimized logical plan from the logical plan, as well as a step 1410 of generating a physical plan from the optimized logical plan. This process includes converting the logical algebraic representation of the logical plan into a physical algebraic expression. The optimized logical plan and physical plan are equivalent to one another. The physical plan can be in the form of an executable instruction set.

Next, the method includes a step 1412 of folding the physical plan into a search query that can be executed by a search engine. The search query is a created from the executable instruction set.

Once the search is performed, the method includes a step 1414 of returning results of the search query to a client. Again, the results are generated and returned in a row and set format that represents what the user would expect when receiving a response to a structured query. Although the format is similar, the content included in the response can be far more robust than would be available if a pure SQL query were executed. That is, converting the structured query into a search query allows for the structured query to be effectively run as, for example, a full text search, which is impossible using SQL.

FIG. 15 illustrates an example conversion of a structured query (SQL) 1502 into a physical plan 1504 using the aspects of the present disclosure provided herein.

Figure 16:
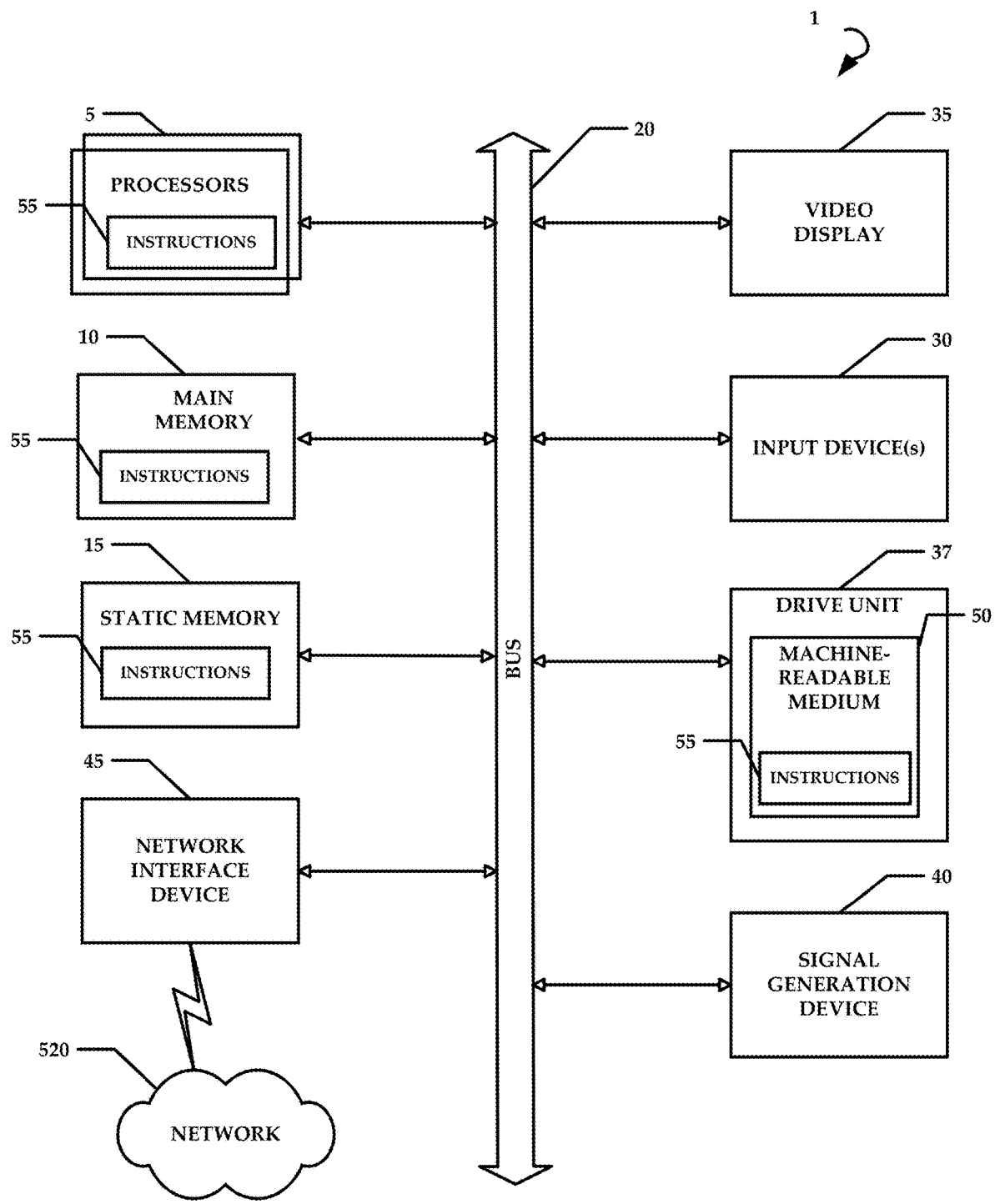
FIG. 16 is a diagrammatic representation of an example machine in the form of a computer system.

FIG. 16 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a machine-readable medium 50 (which may be a computer readable medium) on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 112 or network 520, see FIG. 1 and FIG. 5, respectively) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A distributed, multi-tenant search and analytics document search engine system that converts and processes structured queries as search queries, the system comprising:
   a structured query language (SQL) parser that parses a SQL structured query into a tree structure;
   an analyzer module configured to:
      semantically analyze the tree structure;
      semantically validate components of the SQL structured query;
      resolve the components of the SQL structured query;
      generate a resolved logical plan from the tree structure using aliasing of at least a portion of the components of the SQL structured query; and
      resolve hidden references in the SQL structured query, the hidden references being available but being filtered by intermediate levels of processing;
   a planner module that generates an optimized logical plan from the resolved logical plan; and
   an execution module that:
      generates a physical plan from the optimized logical plan, the physical plan comprising a search query that can be executed by a search engine to perform retrieval, search, filtering and aggregation, wherein the search query has a higher specificity than the SQL structured query; and
      returns results of the search query to a client.

2. The distributed, multi-tenant search and analytics document search engine system according to claim 1, wherein the planner module generates the optimized logical plan from the resolved logical plan by performing any of operator pruning and execution elimination.

3. The distributed, multi-tenant search and analytics document search engine system according to claim 1, wherein the physical plan comprises automatically generated executable code that can be executed by a search engine to perform search, filtering, and aggregations and to resolve the SQL structured query.

4. The distributed, multi-tenant search and analytics document search engine system according to claim 1, wherein the system performs a distributed full text search of resources using the physical plan that is based on the SQL structured query and the results include data obtained from the full text search.

5. A distributed, multi-tenant search and analytics document search engine system, the system comprising:
   a processor; and
   a memory for storing executable instructions, the processor executing the instructions to:
      allow a user to input a structured query language (SQL) request including a SQL query;
      parse the SQL query into a tree structure;
      validate components of the SQL query, so as to ensure that the components are syntactically valid;
      semantically resolve the components of the SQL query, so as to ensure that the components are semantically valid;
      generate a resolved logical plan from the tree structure using aliasing of at least a portion of the components of the SQL query;

resolve hidden references in the SQL query, the hidden references being available but being filtered by intermediate levels of processing;

convert the SQL request into a physical plan comprising a search query that can be executed by a search engine using pattern matching implemented as a rule set, wherein the search query has a higher specificity than the SQL request;

perform a retrieval, search, filtering and aggregation query using the physical plan to produce results; and return a response to the SQL request based on the results of the retrieval, search, filtering and aggregation query.

6. A method for a distributed, multi-tenant search and analytics document search engine system that converts and processes structured queries as search queries, the method comprising:

receiving a structured query language (SQL) query from a user, the structured query language (SQL) being ANSI SQL;

converting the SQL query to an executable search query by:

parsing the SQL query into a tree structure;

validating components of the SQL query, so as to ensure that the components are syntactically valid;

semantically resolving the components of the SQL query, so as to ensure that the components are semantically valid;

generating a resolved logical plan from the tree structure by semantically analyzing the tree structure and using aliasing of at least a portion of the components of the SQL query;

resolving hidden references in the SQL query, the hidden references being available but being filtered by intermediate levels of processing;

generating an optimized logical plan from the resolved logical plan; and generating a physical plan from the optimized logical plan, the physical plan being folded into a search query that can be executed by a search engine to perform retrieval, search, filtering and aggregation, wherein the search query has a higher specificity than the SQL query;

wherein the search query has a higher granularity than the SQL query; and wherein the search query includes a Domain Specific Language (DSL); and returning results of the search query to a client.

7. The method according to claim 6, wherein the generating the optimized logical plan from the resolved logical plan comprises performing any of operator pruning and execution elimination.

8. The method according to claim 6, wherein the physical plan comprises automatically generated executable code that can be executed by a search engine to resolve the SQL query.

9. The method according to claim 8, further comprising performing a distributed full text search of resources using the physical plan that is based on the SQL query and the results include data obtained from the full text search.

10. The method according to claim 6, wherein the converting the SQL query to the executable search query further comprises mapping components of the SQL query into a logical algebraic expression of the tree structure and translating the logical algebraic expression of the tree structure into a physical algebraic expression, the physical algebraic expression being an executable instruction set.

11. The method according to claim 6, wherein the search query is executed over a non-relational database.

\* \* \* \* \*